No. 695,000. Patented Mar. 11, 1902.
E. B. SHAMBAUGH.
CLOD FENDER.
(Application filed Aug. 12, 1901.)
(No Model.)
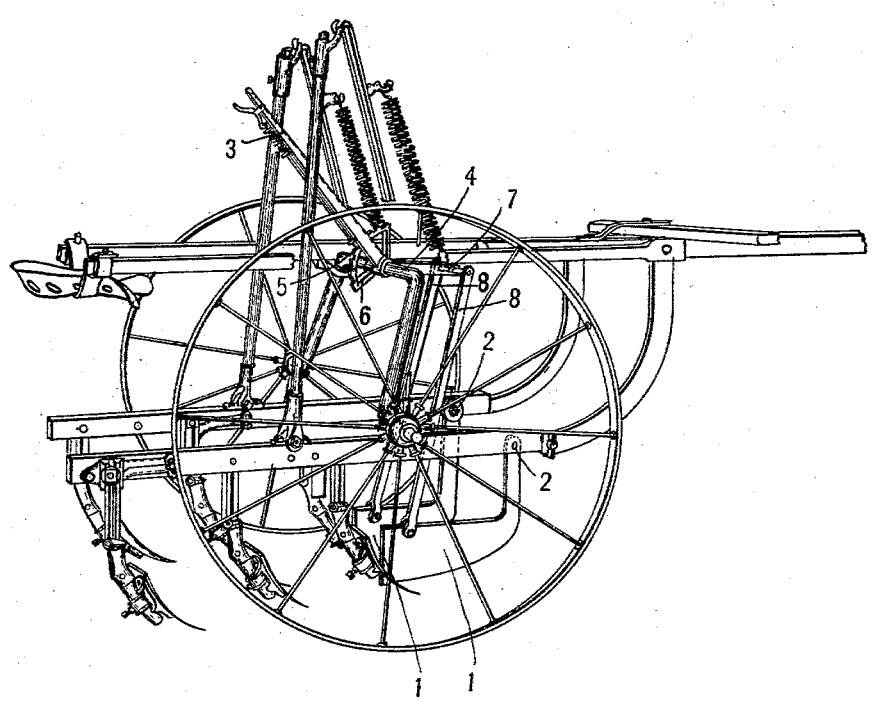
Witnesses
Frank A. Fahle
Bertha M. Ballard
Inventor
Elias B. Shambaugh.
By
Arthur M. Hood
Attorney

UNITED STATES PATENT OFFICE.

ELIAS B. SHAMBAUGH, OF BROWN TOWNSHIP, INDIANA.

CLOD-FENDER.

SPECIFICATION forming part of Letters Patent No. 695,000, dated March 11, 1902.

Application filed August 12, 1901. Serial No. 71,681. (No model.)

*To all whom it may concern:*

Be it known that I, ELIAS B. SHAMBAUGH, a citizen of the United States, residing in Brown township, in the county of Hendricks and State of Indiana, have invented a new and useful Clod-Fender, of which the following is a specification.

My invention relates to an improvement in the clod-fenders for either walking or riding cultivators.

The object of my invention is to provide means within easy access of the operator by which the clod-fenders may be readily adjusted toward and from the ground in order to accommodate them to the character of the crop over which the machine is passing.

The accompanying drawing, which is a perspective view, illustrates my invention as applied to a riding-cultivator.

The drawing is a perspective view representing my invention applied to a hammock-cultivator.

In the drawing, 1 1 indicate a pair of clod-fenders which may be of the usual form, each of said fenders being pivoted at 2 to the frame of the machine.

Pivoted or otherwise movably mounted upon the frame of the machine is a lever or handle 3, which in the present case is shown pivoted upon the arch of the axle 4. Lever 3 is provided with a suitable spring-catch 5, which coöperates with a stationary segment 6. Connected to the short arm 7 of lever 3 are two links 8 8, each of which extends downward and is pivoted at its lower end to one of the clod-fenders 1, the arrangement being such that by swinging lever 3 the rear end of the fenders may be simultaneously raised from or forced toward the ground.

In operation the driver may by swinging the lever 3 readily adjust the fenders to suit the height of the drop over which the machine is at any moment passing, the said fenders being thrown closer to the ground when the crop is low and farther away from the ground when the crop stands higher. In most fields, especially of corn, there are always spots where the corn is much lower than in the general field, and if the fenders be set properly for the cultivation of the high corn the low corn is damaged by the clods. By the use of my device, however, the fenders are continually under control of the driver and may be adjusted to suit any condition of crop.

It will be readily understood that many changes in the particular means for rendering the fenders readily adjustable may be produced without departing from the spirit of my invention.

I claim as my invention—

1. The combination with a cultivator having a pair of plows, of a pair of clod-fenders each movably mounted upon the cultivator and adjacent the plows, and means within easy reach of the operator for simultaneously adjusting said fenders toward and from the ground independently of the plows.

2. The combination with a cultivator having a pair of plows, of a pair of clod-fenders movably mounted thereon each adjacent a plow, a lever also mounted on the cultivator, a cross-bar carried by said lever, a pair of links both connected to said cross-bar and each connected to a fender, and means for holding said lever in adjusted positions.

ELIAS B. SHAMBAUGH.

Witnesses:
ARTHUR M. HOOD,
BERTHA M. BALLARD.